United States Patent [19]

Dorsch et al.

[11] 4,104,268
[45] Aug. 1, 1978

[54] CATIONIC DIAZACYANINE DYESTUFFS

[75] Inventors: Hans-Lothar Dorsch, Koeln-Stammheim; Roderich Raue, Leverkusen-Wiesdorf, both of Germany

[73] Assignee: Bayer Aktiengesellschaft, Leverkusen, Germany

[21] Appl. No.: 368,304

[22] Filed: Jun. 8, 1973

[30] Foreign Application Priority Data

Jun. 9, 1972 [DE] Fed. Rep. of Germany ....... 2228147

[51] Int. Cl.² ............................................. C09B 43/00
[52] U.S. Cl. ................................. 260/158; 260/146 R
[58] Field of Search ............................ 260/158, 146 R

[56] References Cited

U.S. PATENT DOCUMENTS

| | | | |
|---|---|---|---|
| 3,086,002 | 4/1963 | Baumann et al. | 260/155 |
| 3,136,751 | 6/1964 | Lizuka et al. | 260/158 |
| 3,415,807 | 12/1968 | Fisher et al. | 260/158 |

FOREIGN PATENT DOCUMENTS

| | | | |
|---|---|---|---|
| 1,153,239 | 3/1958 | France | 260/158 |
| 2,095,219 | 2/1972 | France | 260/158 |
| 1,018,458 | 1/1966 | United Kingdom | 260/158 |

*Primary Examiner*—Charles F. Warren
*Attorney, Agent, or Firm*—Plumley and Tyner

[57] ABSTRACT

Dyestuffs of the formula

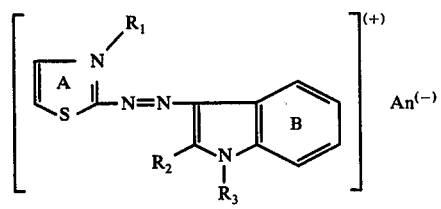

wherein $R_1$ is a straight-chain alkyl, alkenyl, or alkinyl of 3–6 carbon atoms or aralkyl; $R_2$ is aryl; $R_3$ is hydrogen, straight-chain alkyl of 1–6 carbon atoms, straight-chain alkenyl or alkinyl of 3–6 carbon atoms or aralkyl; An is an anion; and the cyclic and acyclic radicals can be further substituted by non-ionic substituents. These dyestuffs are suitable for dyeing and printing of natural and synthetic materials, particularly of polyacrylonitrile, copolymers of acrylonitrile with other vinyl compounds, of acid modified polyesters and acid modified polyamides.

2 Claims, No Drawings

CATIONIC DIAZACYANINE DYESTUFFS

The subject of the present invention are cationic dyestuffs of the general formula

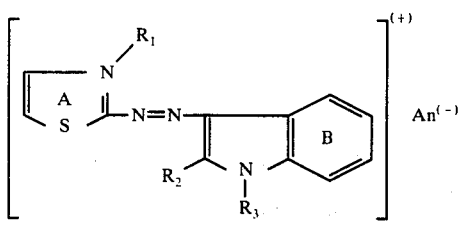

wherein
$R_1$ denotes a straight-chain alkyl, alkenyl or alkinyl radical containing 3 to 6 C atoms, or an aralkyl radical,
$R_2$ denotes an aryl radical,
$R_3$ denotes hydrogen, a straight-chain alkyl radical containing 1 to 6 C atoms, a straight-chain alkenyl or alkinyl radical containing 3 to 6 C atoms or an aralkyl radical and
$An^{(-)}$ denotes an anion,
and wherein
the cyclic and acyclic radicals can be substituted by non-ionic substituents.

A further subject of the invention is the manufacture of the dyestuffs I and their use for dyeing and printing natural and synthetic materials.

Suitable non-ionic substituents of the ring A are, for example, alkyl with 1 – 4 C atoms, chloromethyl, hydroxymethyl, dimethylaminomethyl, methoxy, acetylamino, methylmercapto, halogen, thiocyano, phenyl or phenyl substituted by chlorine or methoxy. Suitable non-ionic substituents of the ring B are, for example, methyl, ethyl, halogen, methoxy, ethoxy, phenyl or phenyl substituted by methyl, halogen or methoxy.

Suitable straight-chain alkyl radicals substituted by non-ionic radicals are, for example, 2-chloroethyl or 2-methoxyethyl.

Suitable straight-chain alkenyl or alkinyl radicals which are optionally substituted by non-ionic radicals are, for example, allyl, buten-(2)-yl, penten-(2)-yl, hexen-(2)-yl, propargyl, butin-(2)-yl, 2,3-dichloroallyl, 2,3-difluoroallyl and 2,3,3-trichloroallyl.

Examples of possible aralkyl radicals are: benzyl, phenylethyl or phenylpropyl-(3) and their derivatives substituted in the nucleus by alkyl, alkoxy or halogen. Aryl for example represents phenyl or naphthyl and their derivatives, such as 4-methylphenyl or 2-methylphenyl.

Possible anionic radicals $An^-$ are the organic and inorganic anions which are customary for cationic dyestuffs.

Inorganic anions are, for example, fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus such as dihydrogen-phosphate, hydrogen-phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of methyl phosphate.

Organic anions are, for example, anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethyl-sulphonic acid, methylaminoethyl-sulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethylglycollic acid, thioglycollic acid, glyceric acid, malic acid, dodecyl-tetraethylene glycol-ether-propionic acid, 3-(nonyloxy)-propionic acid, 3-(isotridecyloxy)-propionic acid, 3-(isotridecyloxy)-diethylene glycol-ether-propionic acid, the ether-propionic acid of an alcohol mixture with 6 to 10 carbon atoms, thioacetic acid, 6-benzoylamino-2-chlorocaproic acid, nonylphenol-tetraethylene glycol-ether-propionic acid, nonylphenol-diethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargyllic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl-ether-$\alpha,\alpha'$-dicarboxylic acid, methylene-bis-thioglycollic acid, dimethylsulphide-$\alpha,\alpha$-dicarboxylic acid, 2,2'-dithio-di-n-propionic acid, fumaric acid, maleic acid, itaconic acid, ethylene-bis-iminoacetic acid, nitrilosulphonic acid methanesulphonic acid, ethanesulphonic acid, chloromethanesulphonic acid, 2-chloroethanesulphonic acid and 2-hydroxyethanesulphonic acid, and Mersolat, that is to say $C_8$–$C_{15}$ paraffinsulphonic acid, obtained by chlorosulphonation of paraffin oil.

Suitable anions of cycloaliphatic carboxylic acids are, for example, the anions of cyclohexanecarboxylic acid and cyclohexene-3-carboxylic acid and anions of araliphatic monocarboxylic acids are, for example, anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6- chloro-3-nitro-benzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Suitable anions of heterocyclic carboxylic acids are, for example, the anions of pyromucic acid, dehydromucic acid and indolyl-(3)-acetic acid.

Suitable anions of aromatic sulphonic acids are, for example, the anions of benzenesulphonic acid, benzene-1,3-sulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 1-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

A suitable anion of heterocyclic sulphonic acids, is, for example, the anion of quinoline-5-sulphonic acid.

Further possibilities are the anions of arylsulphinic, arylphosphonic and arylphosphonous acids, such as benzenesulphinic and benzenephosphonic acid.

Colourless anions are preferred. Anions which do not excessively impair the solubility of the dyestuff in water are preferred for dyeing from an aqueous medium. Anions which assist the solubility of the dyestuff in organic solvents or at least do not influence it adversely are frequently also preferred for dyeing from organic solvents.

The anion is generally determined by the manufacturing process and by the purification of the crude dyestuff which may have been carried out. In general, the dyestuffs are in the form of halides (especially chlorides or bromides) or in the form of methosulphates, ethosulphates, sulphates, benzenesulphonates or toluenesulphonates or acetates. The anions can be replaced in a known manner by other anions.

A preferred group within the framework of the dyestuffs according to the invention has the formula

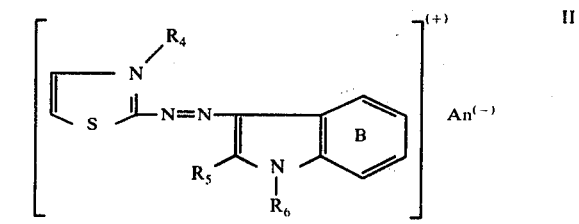

wherein $R_4$ denotes a propyl, butyl, allyl, propargyl or benzyl radical, $R_5$ denotes a phenyl radical or a phenyl radical substituted by methyl, ethyl, methoxy, ethoxy, halogen or nitrile, $R_6$ denotes hydrogen or an alkyl radical with 1 to 4 C atoms and $An^{(-)}$ denotes an anion, and wherein the ring B can be substituted by methyl, methoxy or halogen.

Particularly preferred dyestuffs are those of the formula

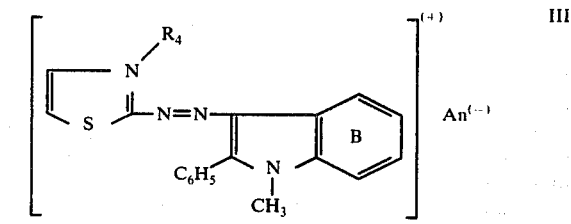

wherein $R_4$, B + $An^{(-)}$ have the meaning indicated in the formula II.

The new diazacyanine dyestuffs are obtained from known dyestuffs of the general formula

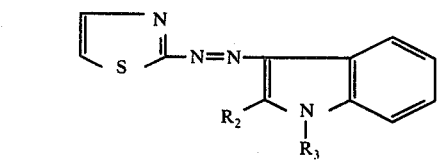

by quaternisation with compounds of the formula $$R_1-X \qquad V$$

wherein

X denotes a radical which can be split off as an anion $An^{(-)}$ and wherein the radicals $R_1$, $R_2$ and $R_3$ have the indicated meaning. X preferably represents halogen, the radical of p-toluenesulphonic acid or the $R_1-OSO_3$ radical.

The quaternisation is carried out in the presence of or without a solvent or diluent, e.g. at 60°–130° C, preferably at 70°–120° C. Suitable solvents are halogen benzenes, halogen alkanes or nitrobenzene.

The azo dyestuffs of the formula IV can be manufactured according to various methods which are in themselves known, the coupling of diazotised 2-aminothiazoles to indoles being the preferred manufacturing process. As examples of diazotisable 2-aminothiazoles there should be mentioned: 2-amino-thiazole, 2-amino-4-methyl-thiazole, 2-amino-4-n-butyl-thiazole, 2-amino-4-chloromethyl-thiazole, 2-amino-4-phenyl-thiazole, 2-amino-4-(4'-methoxy-phenyl)-thiazole, 2-amino-4-(4'-bromo-phenyl)-thiazole, 2-amino-4-(4'-chloro-phenyl)-thiazole, 2-amino-4-methoxy-thiazole, 2-amino-4-hydroxymethyl-thiazole, 2-amino-4-acetyl-thiazole, 2-amino-4-acetylamino-thiazole, 2-amino-4-dimethylaminomethyl-thiazole, 2-amino-5-phenyl-thiazole, 2-amino-5-methyl-thiazole, 2-amino-5-methylmercapto-thiazole, 2-amino-5-acetyl-thiazole, 2-amino-5-methoxy-thiazole, 2-amino-5-bromo(chloro)-thiazole, 2-amino-5-thiocyanato-thiazole, 2-amino-4,5-dimethyl-thiazole, 2-amino-4-methyl-5-ethyl-thiazole, 2-amino-4-phenyl-5-methyl-thiazole and 2-amino-4,5-diphenyl-thiazole.

The following indoles should be mentioned as examples of coupling components: 1-methyl-2-phenyl-indole, 1-methyl-2-(4'-chlorophenyl)-indole, 1-methyl-2-(3'-chlorophenyl)-indole, 1-methyl-2-(4'-methylphenyl)-indole, 1-methyl-2-(3'-methylphenyl)-indole, 1-methyl-2-(4'-methoxyphenyl)-indole, 1-methyl-2-phenyl-5-methoxy-indole, 1-methyl-2-phenyl-5-methyl-indole, 1-methyl-2-phenyl-5-chloro-indole, 1-ethyl-2-phenyl-indole, 1-ethyl-2-(4'-chlorophenyl)-indole, 1-ethyl-2-(3'-chlorophenyl)-indole, 1-ethyl-2-(4'-methylphenyl)-indole, 1-ethyl-2-(3'-methylphenyl)-indole, 1-ethyl-2-(4'-methoxyphenyl)-indole, 1-n-propyl-2-phenyl-indole, 1-n-propyl-2-(4'-chlorophenyl)-indole, 1-n-propyl-2-(4'-methylphenyl)-indole, 1-n-propyl-2-(4'-methoxyphenyl)-indole, 1-n-butyl-2-phenyl-indole, 1-n-butyl-2-(4'-chlorophenyl)-indole, 1-n-butyl-2-(4'-methylphenyl)-indole, 1-n-butyl-2-(4'-methoxyphenyl)-indole, 1-n-pentyl-2-phenyl-indole, 1-n-hexyl-2-phenyl-indole, 1-benzyl-2-phenyl-indole, 1-phenylethyl-2-phenyl-indole, 1-(4'-methylphenyl-ethyl)-2-phenyl-indole, 1-phenylpropyl-2-phenyl-indole, 1-(4'-methylphenyl-propyl)-2-phenyl-indole, 1-[3'-propene(1)]-2-phenyl-indole, 1-(2'-chloroethyl)-2-phenyl-indole, 1-(2'-methoxyethyl)-2-phenyl-indole, 2-phenyl-7-ethyl-indole, 2-phenyl-7-methylindole, 2-phenyl-7-methoxy-indole, 2-phenyl-7-ethoxy-indole, 2-phenyl-7-chloro-indole, 2-phenyl-5-methoxy-indole, 2-phenyl-5-ethoxy-indole, 2-phenyl-5-methyl(ethyl)-indole, 2-phenyl-5-chloro-indole, 2-phenyl-6-chloro(bromo)-indole, 2-phenyl-5-fluoro-indole, 2-phenyl-5,7-dimethyl-indole, 2-phenyl-5,7-dichloro-indole and 2-phenyl-4-chloro-indole.

Examples of possible quaternising agents of the formula V are: 3-bromo-propene-(1), 3-chloro-propene-(1), 1-chloro-2-fluoro-3-bromo-propene-(1), 1,2-dichloro-3-bromo-propene-(1), 1,2-difluoro-3-bromo-propene-(1), 1-bromo-butene-(2), 1-bromo-pentene-(2), 1-bromo-hexene-(2), 1,1-dichloro-2-chloro-3-bromo-propene-(1), p-toluenesulphonic acid allyl ester, 3-bromo-propine-(1), 1-bromo-butine-(2), 1-bromo-propane, 1-bromo-n-butane, benzyl chloride, benzyl bromide, 4-methylphenylmethyl chloride, 4-methoxyphenylmethyl chloride, 4-chlorophenylmethyl chloride, diallyl sulphate and di-n-butyl sulphate.

The products according to the invention are valuable dyestuffs which can be used for dyeing and printing materials of leather, tannin-treated cotton and cellulose acetate and for dyeing fibres containing lignin, such as coir, jute and sisal. They are furthermore suitable for the manufacture of writing fluids, rubber stamp inks and ball pen pastes and can also be used for flexographic printing.

With anionic fillers, such as alumina, tannin, phosphotungstic acids and phosphomolybdic acids, the dyestuffs form light-fast pigments which can be employed advantageously in paper printing.

Suitable materials for dyeing and printing with the basic dyestuffs of the above general formula are in particular flocks, fibres, filaments, tapes, woven fabrics or knitted fabrics of polyacrylonitrile or of copolymers of acrylonitrile with other vinyl compounds, such as vinyl chloride, vinylidene chloride, vinyl fluoride, vinyl acetate, vinylpyridine, vinylimidazole, vinyl alcohol, acrylic acid esters and amides and methacrylic acid esters and amides and asymmetrical dicyanoethylene, some of the dyestuffs being distinguished by high speed of absorption; the dyestuffs are also suitable for dyeing flocks, fibres, filaments, tapes, woven fabrics or knitted fabrics of acid-modified aromatic polyesters and for dyeing acid-modified polyamide fibres. Examples of acid-modified aromatic polyesters are polycondensation products of sulphoterephthalic acid and ethylene glycol, that is to say polyethylene glycol terephthalates containing sulphonic acid groups (type DACRON 64 of E. I. Du Pont de Nemours and Company), such as are described in Belgian patent specification No. 549,179 and U.S. Pat. No. 2,893,816.

Dyeing can be carried out from a weakly acid liquor, in which case the material is introduced into the dye bath, appropriately at 40° – 60° C, and is then dyed at the boil. Dyeing can also be carried out under pressure at temperatures above 100° C. Furthermore, the dyestuffs can be added to spinning solutions for the manufacture of fibres containing polyacrylonitrile or also be applied to the unstretched fibre. Finally, the dyestuffs can also be used for dyeing from organic solvents. Stable concentrated solutions of these dyestuffs in chlorinated hydrocarbons are in particular suitable for this purpose.

To manufacture such solutions, the diazacyanine dyestuffs according to the invention (in the form of the free bases or as salts of organic acids with 4 – 30 carbon atoms) are stirred with chlorinated hydrocarbons and monobasic organic acids with 4 – 30 C atoms, optionally with the addition of polar organic solvents which are completely miscible with chlorinated hydrocarbons, such as butyrolactone, dimethylformamide, methanol, dioxane, acetonitrile, methyl ethyl ketone, nitrobenzene, dimethylsulphoxide, benzonitrile and 2-nitrochlorobenzene, if appropriate at an elevated temperature.

The dyeings obtainable according to the invention on material containing polyacrylonitrile are distinguished by good fastness to light, wet processing, rubbing and sublimation and by excellent affinity.

A particularly valuable property of the dyestuffs claimed according to the invention in their high stability which still leads to perfect dyeings even if the pH value in the dye bath exceeds a value of 7.

The dyestuffs can be employed either individually or as mixtures. When dyeing polyacrylonitrile materials, mixtures in many cases show a higher tinctorial strength.

EXAMPLE 1

50 parts of chlorobenzene are distilled from a solution of 127 parts by weight of the compound of the formula

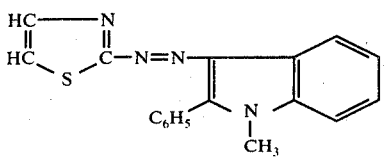

in 850 parts by weight of chlorobenzene in vacuo and thereafter 51 parts by weight of allyl bromide are added dropwise to the warm solution over the course of 90 minutes, at 70°–75° C. The reaction mixture is then stirred for a further 20 hours at this temperature and the crystalline precipitate is filtered off, dried in vacuo and recrystallised from 2% strength aqueous acetic acid, using a little active charcoal. After drying, 114 parts by weight of the dyestuff of the formula

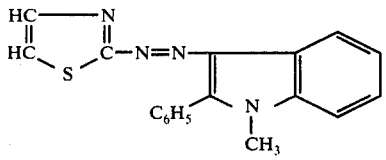

which is pure according to thin layer chromatography and has a melting point of 214° – 216° C are obtained. The dyestuff dyes polyacrylonitrile materials, their copolymers with vinyl compounds and acid-modified polyester or acid-modified polyamide material in a clear red shade. The dyeings are distinguished by their excellent fastness to light and to sublimation. This dyestuff is absorbed more rapidly than the dyestuff 1 of German Pat. No. 1,163,775.

Further valuable dyestuffs, which can be manufactured by an analogous procedure, are listed in Table 1 below. The structural constitution of the dyestuffs corresponds to the formula

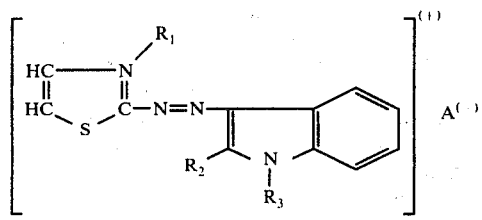

wherein the symbols $R_1$, $R_2$, $R_3$ and A have the meanings indicated in Table 1.

Table 1

| Example No. | $R_1$ | $R_2$ | $R_3$ | A | Shade on polyacrylonitrile |
|---|---|---|---|---|---|
| 2 | —CH$_2$—CH=CH$_2$ | 4-chlorophenyl | CH$_3$ | Br | red |
| 3 | —CH$_2$—CH=CH$_2$ | 3-chlorophenyl | CH$_3$ | Br | " |
| 4 | —CH$_2$—CH=CH$_2$ | 4-methylphenyl | CH$_3$ | Br | " |
| 5 | —CH$_2$—CH=CH$_2$ | 3-methylphenyl | CH$_3$ | Br | " |
| 6 | —CH$_2$—CH=CH$_2$ | 4-methoxyphenyl | CH$_3$ | Br | " |
| 7 | —CH$_2$—CH=CH$_2$ | phenyl | —CH$_2$—CH$_3$ | Br | " |
| 8 | —CH$_2$—CH=CH$_2$ | 4-chlorophenyl | —CH$_2$—CH$_3$ | Br | " |
| 9 | —CH$_2$—CH=CH$_2$ | 3-chlorophenyl | —CH$_2$—CH$_3$ | Br | " |
| 10 | —CH$_2$—CH=CH$_2$ | 4-methylphenyl | —CH$_2$—CH$_3$ | Br | " |
| 11 | —CH$_2$—CH=CH$_2$ | 3-methylphenyl | —CH$_2$—CH$_3$ | Br | " |
| 12 | —CH$_2$—CH=CH$_2$ | 4-methoxyphenyl | —CH$_2$—CH$_3$ | Br | " |
| 13 | —CH$_2$—CH=CH$_2$ | phenyl | —(CH$_2$)$_2$CH$_3$ | Br | " |
| 14 | —CH$_2$—CH=CH$_2$ | 4-chlorophenyl | —(CH$_2$)$_2$CH$_3$ | Br | " |
| 15 | —CH$_2$—CH=CH$_2$ | 3-chlorophenyl | —(CH$_2$)$_2$CH$_3$ | Br | " |
| 16 | —CH$_2$—CH=CH$_2$ | 4-methylphenyl | —(CH$_2$)$_2$CH$_3$ | Br | " |
| 17 | —CH$_2$—CH=CH$_2$ | 3-methylphenyl | —(CH$_2$)$_2$CH$_3$ | Br | " |
| 18 | —CH$_2$—CH=CH$_2$ | 4-methoxyphenyl | —(CH$_2$)$_2$CH$_3$ | Br | " |
| 19 | —CH$_2$—CH=CH$_2$ | phenyl | —(CH$_2$)$_3$CH$_3$ | Br | " |
| 20 | —CH$_2$—CH=CH$_2$ | 4-chlorophenyl | —(CH$_2$)$_3$CH$_3$ | Br | " |
| 21 | —CH$_2$—CH=CH$_2$ | 3-chlorophenyl | —(CH$_2$)$_3$CH$_3$ | Br | " |
| 22 | —CH$_2$—CH=CH$_2$ | 4-methylphenyl | —(CH$_2$)$_3$CH$_3$ | Br | " |
| 23 | —CH$_2$—CH=CH$_2$ | 3-methylphenyl | —(CH$_2$)$_3$CH$_3$ | Br | " |
| 24 | —CH$_2$—CH=CH$_2$ | 4-methoxyphenyl | —(CH$_2$)$_3$CH$_3$ | Br | " |

EXAMPLE 25

9.5 parts by weight of the compound

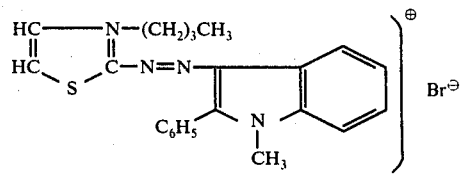

in 60 parts by weight of chlorobenzene are stirred in a pressure vessel with 6.3 parts by weight of 1-bromobutane for 15 hours at 110°, after acidification with 2 parts by volume of glacial acetic acid and adding a little active charcoal, the chlorobenzene is stripped off in steam and the dyestuff is precipitated from the filtrate by means of sodium chloride.

After drying, 6.2 parts by weight of the dyestuff of the formula of melting point 98° – 100° are obtained; the dyestuff dyes polyacrylonitrile materials and acid-modified polyesters or acid-modified polyamide materials in a clear red shade. The dyeings possess very good fastness to light and to sublimation. This dyestuff is distinguished by being absorbed particularly rapidly.

Analogously to this instruction, alkylation with 1-bromopropane also yields further valuable dyestuffs of the formula

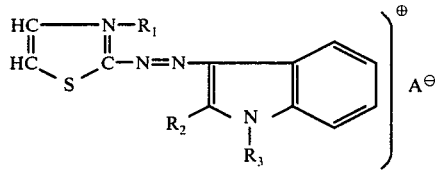

wherein the symbols $R_1$, $R_2$, $R_3$ and A have the meanings indicated in Table 2.

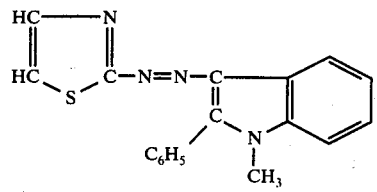

are dissolved in 120 parts by weight of chlorobezene at 60°, about 10 parts of chlorobenzene are distilled off in vacuo and 10 parts by weight of benzyl chloride are added over the course of 2 hours at 115° – 120°. After stirring for a further 4 hours at this temperature a further 10 parts of benzyl chloride are added dropwise and the mixture is stirred for a further 8 hours at this temperature, and the crystalline dyestuff is filtered off and dried in vacuo.

Table 2

| Example No. | $R_1$ | $R_2$ | $R_3$ | A | Shade on polyacrylonitrile |
|---|---|---|---|---|---|
| 26 | —(CH$_2$)$_3$CH$_3$ | 4-methylphenyl | —CH$_3$ | Br | red |
| 27 | —(CH$_2$)$_3$CH$_3$ | 4-methoxyphenyl | —CH$_3$ | Br | " |
| 28 | —(CH$_2$)$_3$CH$_3$ | phenyl | —CH$_2$CH$_3$ | Br | " |
| 29 | —(CH$_2$)$_3$CH$_3$ | 4-methylphenyl | —CH$_2$CH$_3$ | Br | " |
| 30 | —(CH$_2$)$_3$CH$_3$ | 4-methoxyphenyl | —CH$_2$—CH$_3$ | Br | " |
| 31 | —(CH$_2$)$_3$CH$_3$ | phenyl | —(CH$_2$)$_2$CH$_3$ | Br | " |
| 32 | —(CH$_2$)$_3$CH$_3$ | 4-methylphenyl | —(CH$_2$)$_2$CH$_3$ | Br | " |
| 33 | —(CH$_2$)$_3$CH$_3$ | 4-methoxyphenyl | —(CH$_2$)$_2$CH$_3$ | Br | " |
| 34 | —(CH$_2$)$_3$CH$_3$ | phenyl | —(CH$_2$)$_3$CH$_3$ | Br | " |
| 35 | —(CH$_2$)$_3$CH$_3$ | 4-methylphenyl | —(CH$_2$)$_3$CH$_3$ | Br | " |
| 36 | —(CH$_2$)$_3$CH$_3$ | 4-methoxyphenyl | —(CH$_2$)$_3$CH$_3$ | Br | " |
| 37 | —(CH$_2$)$_2$CH$_3$ | phenyl | CH$_3$ | Br | " |
| 38 | —(CH$_2$)$_2$CH$_3$ | 4-methylphenyl | CH$_3$ | Br | " |
| 39 | —(CH$_2$)$_2$CH$_3$ | 4-methoxyphenyl | CH$_3$ | Br | " |
| 40 | —(CH$_2$)$_2$CH$_3$ | phenyl | —CH$_2$CH$_3$ | Br | " |
| 41 | —(CH$_2$)$_2$CH$_3$ | 4-methylphenyl | —CH$_2$CH$_3$ | Br | " |
| 42 | —(CH$_2$)$_2$CH$_3$ | 4-methoxyphenyl | —CH$_2$CH$_3$ | Br | " |
| 43 | —(CH$_2$)$_2$CH$_3$ | phenyl | —(CH$_2$)$_2$CH$_3$ | Br | " |
| 44 | —(CH$_2$)$_2$CH$_3$ | 4-methylphenyl | —(CH$_2$)$_2$CH$_3$ | Br | " |
| 45 | —(CH$_2$)$_2$CH$_3$ | 4-methoxyphenyl | —(CH$_2$)$_2$CH$_3$ | Br | " |
| 46 | —(CH$_2$)$_2$CH$_3$ | phenyl | —(CH$_2$)$_3$CH$_3$ | Br | " |
| 47 | —(CH$_2$)$_2$CH$_3$ | 4-methyphenyl | —(CH$_2$)$_3$CH$_3$ | Br | " |
| 48 | —(CH$_2$)$_2$CH$_3$ | 4-methoxyphenyl | —(CH$_2$)$_3$CH$_3$ | Br | " |

EXAMPLE 49

A solution of 19 parts by weight of the azo dyestuff of the formula

After recrystallisation from dilute aqueous acetic acid using a little active charcoal, filtering, completely precipitating the dyestuff with a little sodium chloride and drying, 14.4 parts by weight of a pure dyestuff of melting point 207° – 209° are obtained.

This dyestuff dyes polyacrylonitrile, acid-modified polyester and acid-modified polyamide material in clear red shades which are fast to light and to sublimation.

The particularly rapid absorption of this dyestuff should be highlighted.

Analogously to this procedure, further valuable dyestuffs listed in Table 3 below are obtained. The symbols $R_1$, $R_2$, $R_3$ and A correspond to those of Table 1.

Table 3

| Example No. | $R_1$ | $R_2$ | $R_3$ | A | Shade on PAN |
|---|---|---|---|---|---|
| 50 | —CH$_2$—⟨phenyl⟩ | phenyl | —CH$_2$CH$_3$ | Cl | red |
| 51 | —CH$_2$—⟨phenyl⟩ | phenyl | —(CH$_2$)$_2$CH$_3$ | Cl | " |
| 52 | —CH$_2$—⟨phenyl⟩ | phenyl | —(CH$_2$)$_3$CH$_3$ | Cl | " |
| 53 | —CH$_2$—⟨phenyl⟩ | 4-methylphenyl | CH$_3$ | Cl | " |
| 54 | —CH$_2$—⟨phenyl⟩ | 4-methylphenyl | —CH$_2$CH$_3$ | Cl | " |

Table 3-continued

| Example No. | R₁ | R₂ | R₃ | A | Shade on PAN |
|---|---|---|---|---|---|
| 55 | —CH₂—⌬ | 4-methylphenyl | —(CH₂)₂CH₃ | Cl | " |
| 56 | —CH₂—⌬ | 4-methylphenyl | —(CH₂)₃CH₃ | Cl | " |
| 57 | —CH₂—⌬ | 4-methoxyphenyl | CH₃ | Cl | " |
| 58 | —CH₂—⌬ | 4-methoxyphenyl | —CH₂CH₃ | Cl | " |
| 59 | —CH₂—⌬ | 4-methoxyphenyl | —(CH₂)₂CH₃ | Cl | " |
| 60 | —CH₂—⌬ | 4-methoxyphenyl | —(CH₂)₃CH₃ | Cl | " |
| 61 | —CH₂—⌬ | 4-chlorophenyl | CH₃ | Cl | " |
| 62 | —CH₂—⌬ | 4-chlorophenyl | —CH₂CH₃ | Cl | " |
| 63 | —CH₂—⌬ | 4-chlorophenyl | —(CH₂)₂CH₃ | Cl | " |
| 64 | —CH₂—⌬ | 4-chlorophenyl | —(CH₂)₃CH₃ | Cl | " |
| 65 | —CH₂—⌬—CH₃ | phenyl | CH₃ | Cl | " |
| 66 | —CH₂—⌬—CH₃ | phenyl | —CH₂CH₃ | Cl | " |
| 67 | —CH₂—⌬—CH₃ | phenyl | —(CH₂)₂CH₃ | Cl | " |
| 68 | —CH₂—⌬—CH₃ | phenyl | —(CH₂)₃CH₃ | Cl | " |
| 69 | —CH₂—⌬—OCH₃ | phenyl | CH₃ | Cl | " |
| 70 | —CH₂—⌬—OCH₃ | phenyl | —CH₂CH₃ | Cl | " |
| 71 | —CH₂—⌬—OCH₃ | phenyl | —(CH₂)₂CH₃ | Cl | " |
| 72 | —CH₂—⌬—OCH₃ | phenyl | —(CH₂)₃CH₃ | Cl | " |
| 73 | —CH₂—⌬—Cl | phenyl | CH₃ | Cl | " |
| 74 | —CH₂—⌬—Cl | phenyl | —CH₂CH₃ | Cl | " |
| 75 | —CH₂—⌬—Cl | phenyl | —(CH₂)₂CH₃ | Cl | " |
| 76 | —CH₂—⌬—Cl | phenyl | —(CH₂)₃CH₃ | Cl | " |

EXAMPLE 77

Using a liquor ratio of 1:40, polyacrylonitrile fibres are introduced into an aqueous bath at 40° which contains, per liter, 0.75 g of 30% strength acetic acid, 0.38 g of sodium acetate and 0.5 g of the dyestuff of the formula

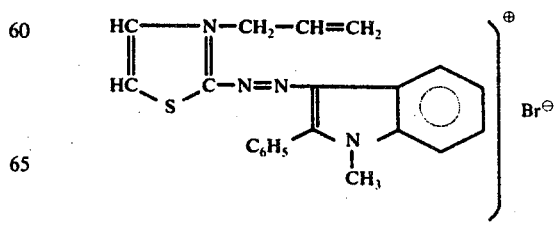

The dyebath is heated to the boil over the course of 20–30 minutes and is kept at this temperature for 30–60 minutes. Thereafter the polyacrylonitrile fibres are rinsed and dried. They have been dyed in a clear red of excellent general level of fastness.

EXAMPLE 78

Using a liquor ratio of 1:40, acid-modified polyglycol terephthalate fibres are introduced into an aqueous bath at 20° which contains, per liter, 6–10 g of sodium sulphate, 0.5 – 1 g of oleyl polyglycol ether (50 mols of ethylene oxide), 0 – 15 g of dimethyl-benzyl-dodecylammonium chloride and 0.5 g of the dyestuff

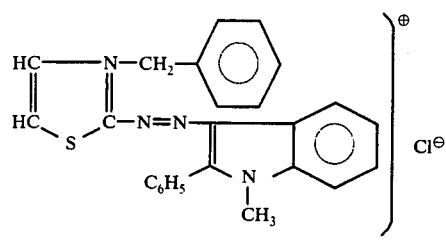

and which has been adjusted to pH 4–5 with acetic acid. The bath is heated to 100° over the course of 30 minutes and is kept at this temperature for 60 minutes. Thereafter the fibres are rinsed and dried. A red dyeing of very good fastness properties is obtained.

EXAMPLE 79

A polyacrylonitrile fabric is printed with a printing paste which was manufactured in the following manner: 330 parts of hot water are poured over 50 parts by weight of the dyestuff of the formula

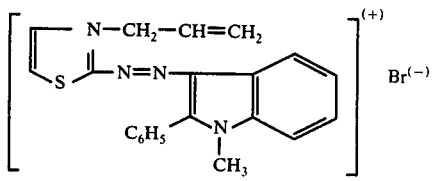

50 parts of thiodiethylene glycol, 30 parts of cycohexanol and 30 parts of 30% strength acetic acid and the resulting solution is added to 500 parts of crystal gum (gum arabic as the thickener. Thereafter, 30 parts of zinc nitrate solution are also added. The resulting print is dried, steamed for 30 minutes and subsequently rinsed. A clear red print of very good fastness properties is obtained.

EXAMPLE 80

15 parts by weight of the dyestuff mentioned in Example 1, 15 parts by weight of polyacrylonitrile and 70 parts by weight of dimethylformamide are used to manufacture a stock solution of the dyestuff which is added to the customary spinning solution and spun in a known manner. A red fibre having very good fastness properties is obtained.

We claim:

1. A dyestuff of the formula

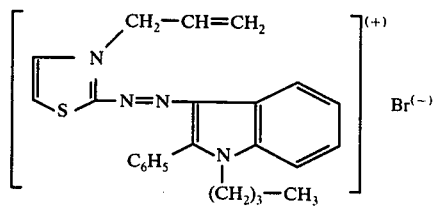

2. A dyestuff of the formula

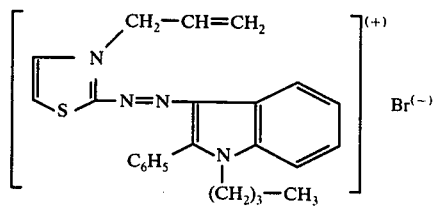

* * * * *